US007216913B1

(12) United States Patent
Volsey, II

(10) Patent No.: US 7,216,913 B1
(45) Date of Patent: May 15, 2007

(54) HINGED GLOVE BOX DOOR FOR MOTORCYCLES

(76) Inventor: Jack J. Volsey, II, 589 Douglas Dr., Rock Springs, WY (US) 82901

( * ) Notice: Subject to any disclaimer, the term of this patent is extended or adjusted under 35 U.S.C. 154(b) by 0 days.

(21) Appl. No.: 11/360,168

(22) Filed: Feb. 22, 2006

(51) Int. Cl.
*B62J 17/02* (2006.01)

(52) U.S. Cl. .................................. 296/37.12; 296/78.1

(58) Field of Classification Search ............ 296/37.12, 296/37.1, 78.1; 224/483
See application file for complete search history.

(56) References Cited

U.S. PATENT DOCUMENTS

| | | | | |
|---|---|---|---|---|
| 1,700,121 A | * | 1/1929 | De Boer | 312/308 |
| 2,073,171 A | * | 3/1937 | Pittroff | 312/246 |
| 2,301,730 A | * | 11/1942 | Mann | 312/293.2 |
| 3,606,447 A | * | 9/1971 | Ryding | 296/37.12 |
| 4,278,285 A | * | 7/1981 | Cummings et al. | 296/78.1 |
| 4,309,012 A | * | 1/1982 | Fukunaga | 248/27.1 |
| 4,552,399 A | * | 11/1985 | Atarashi | 296/37.12 |
| 5,364,153 A | * | 11/1994 | Vaxelaire | 296/97.5 |
| 5,520,313 A | * | 5/1996 | Toshihide | 224/539 |
| 6,050,628 A | * | 4/2000 | Allison et al. | 296/37.12 |
| 2003/0001402 A1 | * | 1/2003 | Sawatani et al. | 296/37.1 |
| 2003/0222473 A1 | * | 12/2003 | Yamamoto et al. | 296/37.1 |

FOREIGN PATENT DOCUMENTS

| | | | | |
|---|---|---|---|---|
| FR | 2631297 A1 | * | 11/1989 | 224/483 |
| GB | 2249579 A | * | 5/1992 | 224/483 |
| JP | 58174048 A | * | 10/1983 | 15/250.04 |
| JP | 60076440 A | * | 4/1985 | 224/483 |
| JP | 04085145 A | * | 3/1992 | 224/539 |
| JP | 04090939 A | * | 3/1992 | 224/481 |
| JP | 2006143023 A | * | 6/2006 | 296/78.1 |

* cited by examiner

*Primary Examiner*—D. Glenn Dayoan
*Assistant Examiner*—Paul Chenevert
(74) *Attorney, Agent, or Firm*—Risto A. Rinne, Jr.

(57) ABSTRACT

An apparatus for use with motorcycles is adapted to cooperate with an opening that is provided in a fairing, fuel tank, cowling, trunk, saddlebag or other accessory item of the motorcycle. A frame structure of the apparatus includes a front face plate and two side members that are in a parallel spaced apart relationship with respect to each other. Each of the two side members is attached to an opposite side of the face plate and perpendicular with respect thereto. The face plate includes an opening that is closed when a hinged door is pivoted into a first closed position. Various methods of securing the apparatus in the opening are disclosed, some of which do not modify, mar, or otherwise damage any portion of the motorcycle.

14 Claims, 2 Drawing Sheets

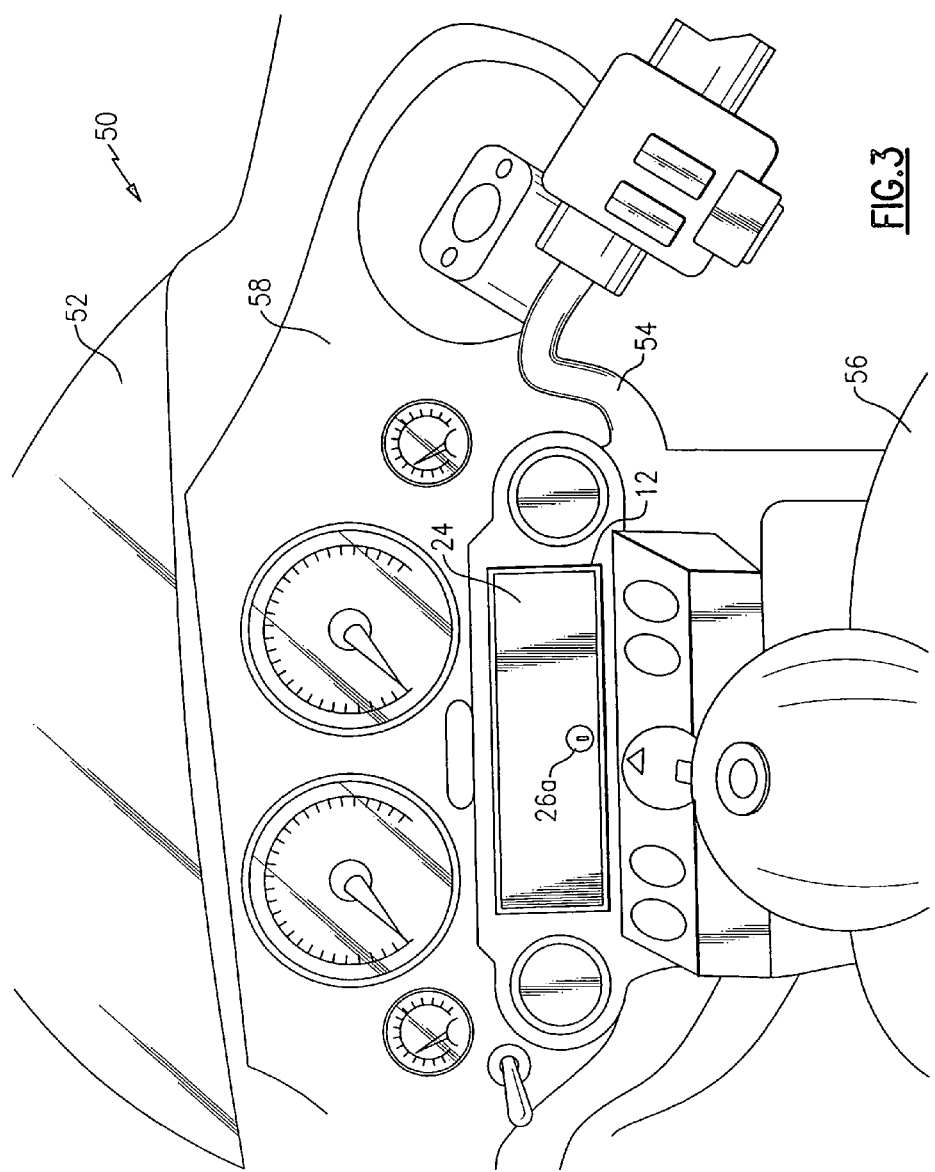

HINGED GLOVE BOX DOOR FOR MOTORCYCLES

BACKGROUND OF THE INVENTION

1. Field of the Invention

The present invention, in general relates to motorcycles and, more particularly, to a storage device for use on a motorcycle.

Motorcycles are well known devices that have, in general, a severely limited storage capacity. Certain motorcycles have a recessed opening that is provided in a fairing or in a console area where an operator of the motorcycle may place gloves or similar items. Select model Harley Davidson brand motorcycles include this type of the recessed opening. Also accessory items, like fairings, that may be purchased and then attached to the motorcycle may also include a suitable type of the recessed opening.

A problem is that during riding, wind and vibration can cause items placed therein to be expelled and lost along the highway. This tends to make the recessed opening of little practical value.

Furthermore, the opening is, of itself, unsightly.

Also, not a minor consideration is that because the appearance of a motorcycle is usually quite important to the owner, he or she may be reluctant to incorporate any accessory item that could potentially cause permanent damage or modification to the existing structures of the motorcycle.

Owners prefer to add an accessory item that is fastened in such manner that, if later removed, the appearance of the motorcycle can be returned to normal.

Accordingly, there exists today a need for a hinged glove box door for motorcycles that helps ameliorate the above-mentioned problems and difficulties.

Clearly, such an apparatus would be useful and desirable.

2. Description of Prior Art

Motorcycles and open recessed areas in motorcycles are, in general, known. While the structural arrangements of the known prior devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a hinged glove box door for motorcycles that is adapted to cooperate with a recessed area and provide a door that is attached to the area.

It is also an important object of the invention to provide a hinged glove box door for motorcycles that provides a rigid hinged door that covers an opening.

Another object of the invention is to provide a hinged glove box door for motorcycles that does not require the use of tools to install the device in certain applications.

Still another object of the invention is to provide a hinged glove box door for motorcycles that is versatile.

Still yet another object of the invention is to provide a hinged glove box door for motorcycles that is inexpensive to manufacture.

Yet another important object of the invention is to provide a hinged glove box door for motorcycles that is visually attractive.

Still yet another important object of the invention is to provide a hinged glove box door for motorcycles that provides a secure retention of items that are placed in a recessed area of the motorcycle.

A first continuing object of the invention is to provide a hinged glove box door for motorcycles that is adapted for different size openings.

A second continuing object of the invention is to provide a hinged glove box door for motorcycles that includes a latch attached to the door sufficient to retain the door in a closed position.

A third continuing object of the invention is to provide a hinged glove box door for motorcycles that increases the storage capacity of a motorcycle during use.

A fourth continuing object of the invention is to provide a hinged glove box door for motorcycles that can be attached to certain motorcycles without modification or causing damage to an existing structure of the motorcycle.

A fifth continuing object of the invention is to provide a hinged glove box door for motorcycles that, if added and then later removed, will permit return of certain motorcycles to their original condition.

Briefly, a hinged glove box door for motorcycles is constructed in accordance with the principles of the present invention has a frame that is inserted into a recessed opening in a fairing, dashboard, trunk, saddle bag, or other part of the motorcycle. The frame is disposed inside of the recessed opening and is attached thereto, either by a mechanical fastener or by a snap-in-place type of fit that latches the frame in position in the recessed opening. A front face of the frame may be disposed outside of the recessed opening. The frame includes a rear end that is disposed maximally in the recessed opening and distally with respect to the front face. The front face is disposed at a front end of the frame. A door is hingedly attached to the front face and adapted to pivot from a first closed position where access into the recessed opening is blocked into a second open position where access into the recessed opening is provided. The door includes a latch for securing it in the first closed position. Various ways of attaching the device to the recessed opening are described.

BRIEF DESCRIPTION OF THE DRAWINGS

FIG. 3 is a view in perspective of the hinged glove box door for motorcycles attached to a fairing of a motorcycle.

DETAILED DESCRIPTION OF THE INVENTION

Figure 1:
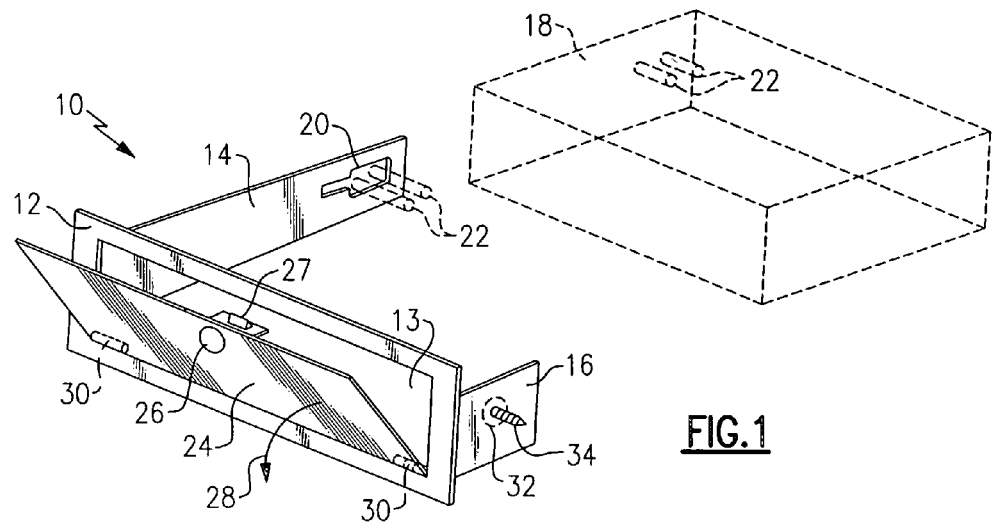
FIG. 1 is a view in perspective of a hinged glove box door for motorcycles showing two types of attachment.

Referring to FIG. 1 is shown, a hinged glove box door for motorcycles, identified in general by the reference numeral 10.

The hinged glove box door for motorcycles 10 includes a front face (plate) 12, a first side member 14 and a second side member 16. The front face 12, first side member 14, and second side member 16 together form a frame.

The frame 12, 14, 16 is inserted into a recessed opening 18 (shown in dashed lines) in a fairing, dashboard, trunk, saddle bag, cowling, or any other part of the motorcycle.

The front face 12 includes a center opening 13 to allow access to the recessed opening 18.
}

The front face 12 may be disposed in the recessed opening 18 or it may be disposed outside of it, or part of the front face 12 may be disposed in the recessed opening 18 and part of it may extend out from the recessed opening 18, as desired. The first side member 14 and the second side member 16 are disposed in the recessed opening 18.

When inserted in the recessed opening 18, either the first side member 14 or the second side member 16 is attached to some portion of an interior of the recessed opening 18 by any of a variety of ways, some of which are described herein.

Attachment need only be sufficient to retain the hinged glove box door for motorcycles 10 in the recessed opening 18 when the motorcycle is operated (i.e., when it is driven).

The first side member 14 includes a keyhole-shaped opening 20 through which a pair of pins 22 (dashed lines) are shown extending. The pins 22 are included in certain Harley Davidson brand motorcycles and are presumably included to provide electrical power (or some other purpose) if a stereo or other accessory item is placed in the recessed opening. The pins 22 are disposed on both sides of the recessed opening 18 near a back (deep) portion thereof. The pins 22 can include portions of bolts or screws or other types of protrusions.

When the first side member 14 is included as a preferred type of attachment, it may also be included on the other side of the face plate 12 as well as a mirror of the first side member (not shown), instead of the second side member 16. If the first side member 14 and the mirror of the first side member are both included, the following description of installation of the hinged glove box door for motorcycles 10 in the recessed opening 18 is simultaneously accomplished on both sides of the face plate.

As the hinged glove box door for motorcycles 10 is inserted progressively further into the recessed opening 18 from the outside, the rear of the first side member 14 (and the mirror of the first side member) is urged toward the center of the recessed opening 18 sufficient to clear the pins 22.

To displace the first side member 14 inward, a door 24 is opened by depressing a latch button 26 to release the door 24 from a closed position in which a latch mechanism 27 secures one edge of the door 24 to the face plate 12. The door pivots from a first closed position into a second open position as shown by arrow 28 about a pair of hinges 30.

When the door 24 is disposed in the first closed position, the center opening 13 is blocked (obstructed). When the door 24 is disposed in the second open position, the center opening 13 is open and an interior of the recessed opening 18 is accessible.

After the hinged glove box door for motorcycles 10 has been fully inserted in the recessed opening 18, the first side member 14 is released and it naturally extends back to a position perpendicular with respect to the front face 12.

In that normal, quiescent position, the pins 22 pass through the keyhole-shaped opening 20 and retain the hinged glove box door for motorcycles 10 in position even when the motorcycle is driven.

Other shapes are of course possible for the keyhole-shaped opening 20, providing they can engage with the pins 22 of the recessed opening 18 sufficient to retain the hinged glove box door for motorcycles 10 in the opening 18.

If it ever becomes desirable to remove the hinged glove box door for motorcycles 10 from the recessed opening 18, the door 24 is opened and the first side member 14 (and the mirror of the first side opening, if included) are urged inward sufficient to clear the pins 22. The hinged glove box door for motorcycles 10 is then pulled out of the recessed opening 18.

No damage or modification to the recessed opening 18 was required.

For all versions of the hinged glove box door for motorcycles 10 the first side member 14 and the second side member 16 can include different types of fastening systems, as shown or they can be repeated and each mirror the other side. Therefore, for the remainder of possibilities disclosed, only one side (either the first side member 14 or the second side member 16) are described and it is to be understood that the opposite member thereof can be a mirror of that which is being described, if preferred, or it can include a different fastening approach, as shown.

The second side member 16 is short and does not need to penetrate deep into the recessed opening 18. Rather, a hole 32 is provided through which a self-tapping screw 34 is screwed into a surrounding portion of the recessed opening 18 to secure the hinged glove box door for motorcycles 10 in position. Of course, the door 24 must first be opened before the screw 34 can be accessed and tightened. This fastening approach is well suited for applications that do not include the pins 22.

Figure 2:
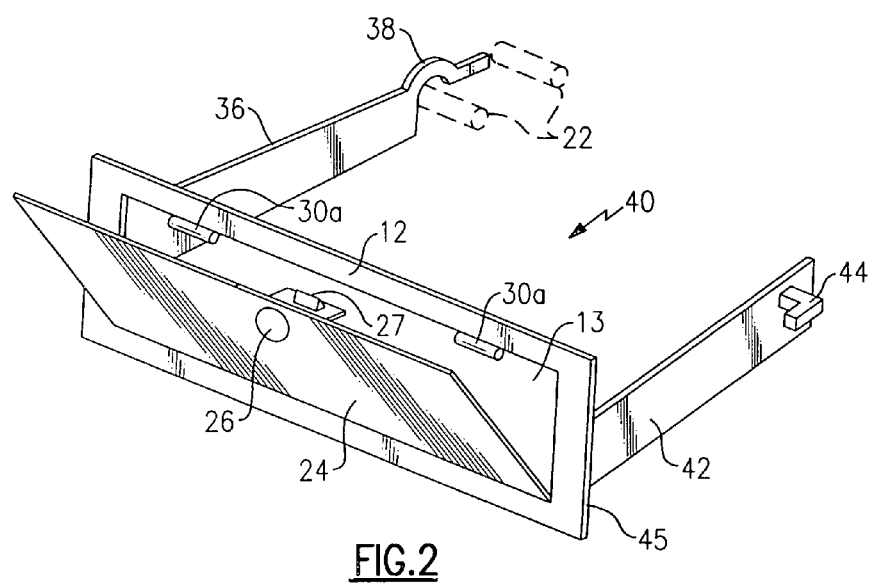
FIG. 2 is a view in perspective of a first hinged glove box door for motorcycles showing another two types of attachment

Referring now to FIG. 2, a modified first side member 36 includes a question mark-shaped member 38 at a distal end thereof. The question mark-shaped member 38 is disposed over at least one of the pins 22 sufficient to engage with a portion of one of the pins 22 and to retain a modified hinged glove box door for motorcycles, identified in general by the reference numeral 40, in position in the recessed opening 18 (not shown in this illustration).

During insertion of the modified hinged glove box door for motorcycles 40 into the recessed opening 18, the modified first side member 36 can again be urged inward as previously described for the first side member 14 or the modified first side member 36 can be forced up and over the pin 22 as it is inserted into the opening 18 until an arcuate portion of the question mark-shaped member 38 is able to urge down and over the pin 22.

A modified second side member 42 includes an "L-shaped" protrusion 44 that extends outward away from the face plate 12. If an opening is provided in a side of the recessed opening, the L-shaped protrusion 44 is adapted to enter into the opening sufficient to retain the modified hinged glove box door for motorcycles 40 in the recessed opening 18.

The modified second side member 42 is urged inward prior to any insertion into the recessed opening 18 sufficient to allow it to enter therein. When the modified hinged glove box door for motorcycles 40 is urged into in the recessed opening 18 a sufficient amount, the L-shaped protrusion 44 automatically expands into the opening and secures the modified hinged glove box door for motorcycles 40 in position.

To remove the modified hinged glove box door for motorcycles 40 from the recessed opening 18, the door 24 is opened and the modified second side member 42 is urged inward sufficient for the L-shaped protrusion 44 to clear the opening in the recessed opening sidewall. Then, the modified hinged glove box door for motorcycles 40 is simply pulled outward.

A modified pair of hinges 30a are shown at the top of the modified hinged glove box door for motorcycles 40. When the modified pair of hinges 30a is used the latch button 26 and the latch mechanism 27 are preferably disposed at the bottom of the door 24. The door 24 in this view is not shown attached to the modified pair of hinges 30a.

An advantage of placing the modified pair of hinges 30*a* at the top of the face plate 12 is to allow the force of gravity to lower the door 24, thereby helping to close it. Of course, magnetic or other types of latching devices (not shown) can be used with the door 24 regardless of whether the pair of hinges 30 or the modified hinges 30*a* are used.

A weather-strip seal 45 is shown around a perimeter of the face plate 12. The weather-strip seal 45 is optional and it can be used around the rear or outer perimeter of the face plate 12 or any other portion of the modified hinged glove box door for motorcycles 40 or the hinged glove box door for motorcycles 10.

When included, the weather-strip seal 45 prevents rain and debris from entering into the recessed opening 18. It also provides the unexpected benefit of preventing play by the hinged glove box door for motorcycles 10 or by the modified hinged glove box door for motorcycles 40 within the recessed opening 18. Play can occur anywhere as provided by manufacturing tolerances and especially around the area of the pin 22.

Referring now to FIG. 3, a portion of a motorcycle, identified in general by the reference numeral 50, is shown. A few parts of the motorcycle 50 that are shown include a windscreen 52, a handlebar 54, a fuel tank 56, and a console 58. The door 24 and face plate 12 are in parallel alignment with a surface plane of the console 58. The remainder of the hinged glove box door 10 or the modified hinged glove box door 40 is disposed in the recessed opening 18 (not shown in this view) that is provided in the console 58.

A neat, pleasant appearance coincides with a practical device for storage of items.

Modifications are, of course, possible after having had benefit of the instant invention. For example, the latch button 26 may be replaced with a key operated latch button 26*a* that permits locking of the door 24 in a closed position, thereby providing a secure storage compartment for the recessed opening 18.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A hinged glove box door insert for motorcycles, comprising:
   (a) a frame that includes a face plate having an opening and a door hinged to said opening, and a first side member and a second side member, said first side member being attached at one end thereof to said face plate at a first end of said face plate and disposed perpendicular with respect thereto, said second side member being attached at one end thereof to said face plate at a second end of said face plate and disposed perpendicular with respect thereto, said second end of said face plate being disposed at an opposite side of said face plate as said first end and wherein said face plate includes an opening therein; and
   (b) means for securing said frame in an opening provided in said motorcycle; and
   (c) wherein said means for securing said frame includes flexible means attached to said first side member or to said second side member, said flexible means adapted to be urged away from a member that is attached to a sidewall of said opening when said hinged glove box door is inserted into said opening sufficient to clear said member, and wherein said flexible means is adapted to be urged toward said member and to engage with said member sufficient to retain said hinged glove box door in said opening when said hinged glove box door is inserted sufficiently far into said opening.

2. The hinged glove box door of claim 1 wherein said second side member is mirror-shaped with respect to said first side member.

3. The hinged glove box door of claim 1 including a door attached to said face plate, said door being adapted to pivot from a first closed position into a second open position.

4. The hinged glove box door of claim 3 wherein said door includes a latch that is adapted to secure said door in said first closed position.

5. The hinged glove box door of claim 4 wherein said latch includes a push to release button.

6. The hinged glove box door of claim 4 wherein said latch includes a keyed lock.

7. The hinged glove box door of claim 1 including means for providing a seal intermediate said hinged glove box door and said opening.

8. The hinged glove box door of claim 7 wherein said means for providing a seal includes a weather-strip that is applied to at least a portion of said hinged glove box door.

9. The hinged glove box door of claim 8 wherein said weather-strip is applied to at least a portion of said face plate.

10. A hinged glove box door insert for motorcycles, comprising:
    (a) a frame that includes a face plate having an opening and a door hinged to said opening, and a first side member and a second side member, said first side member being attached at one end thereof to said face plate at a first end of said face plate and disposed perpendicular with respect thereto, said second side member being attached at one end thereof to said face plate at a second end of said face plate and disposed perpendicular with respect thereto, said second end of said face plate being disposed at an opposite side of said face plate as said first end and wherein said face plate includes an opening therein; and
    (b) means for securing said frame in an opening provided in said motorcycle; and
    (c) wherein said means for securing said frame includes providing a protrusion on either said first side member or on said second side member that is adapted to engage with a member that is disposed in said opening that is provided in said motorcycle.

11. The hinged glove box door of claim 10 wherein said member that is disposed in said opening that is provided in said motorcycle includes a sidewall of said opening and wherein said protrusion engages with an opening that is provided in said sidewall.

12. A hinged glove box door insert for motorcycles, comprising:
    (a) a frame that includes a face plate having an opening and a door hinged to said opening, and a first side member and a second side member, said first side member being attached at one end thereof to said face plate at a first end of said face plate and disposed perpendicular with respect thereto, said second side member being attached at one end thereof to said face plate at a second end of said face plate and disposed perpendicular with respect thereto, said second end of said face plate being disposed at an opposite side of said face plate as said first end and wherein said face plate includes an opening therein; and (b) means for securing said frame in an opening provided in said motorcycle; and (c) wherein said means for securing said frame includes providing an opening in either said first side member or said second side member and a screw that is adapted to pass through said opening and wherein said screw is attached to a sidewall of an interior of said opening that is provided in said motorcycle.

13. A hinged glove box door insert for motorcycles, comprising:

(a) a frame that includes a face plate having an opening and a door hinged to said opening, and a first side member and a second side member, said first side member being attached at one end thereof to said face plate at a first end of said face plate and disposed perpendicular with respect thereto, said second side member being attached at one end thereof to said face plate at a second end of said face plate and disposed perpendicular with respect thereto, said second end of said face plate being disposed at an opposite side of said face plate as said first end and wherein said face plate includes an opening therein; and (b) means for securing said frame in an opening provided in said motorcycle; and (c) wherein said means for securing said frame includes providing an opening in either said first side member or said second side member that is adapted to engage with a member that is disposed in said opening that is provided in said motorcycle.

14. The hinged glove box door of claim 13 wherein said member that is disposed in said opening includes a pin that is attached to a sidewall of said opening and wherein at least a portion of said pin extends into said opening.

* * * * *